United States Patent
von Behrens et al.

(10) Patent No.: US 6,972,659 B2
(45) Date of Patent: Dec. 6, 2005

(54) REUSABLE SHAPE MEMORY ALLOY ACTIVATED LATCH

(76) Inventors: Peter Emery von Behrens, 4021 Rocky Point Dr., Antioch, CA (US) 94509; Dylan Miller Fairbanks, 2817 ½College Ave., Apt. 9A, Berkeley, CA (US) 94705; Kathryn Ann Broughton, 5724 Mendocino Ave., Oakland, CA (US) 94618

( * ) Notice: Subject to any disclaimer, the term of this patent is extended or adjusted under 35 U.S.C. 154(b) by 0 days.

(21) Appl. No.: 10/431,305

(22) Filed: May 6, 2003

(65) Prior Publication Data

US 2004/0035687 A1  Feb. 26, 2004

Related U.S. Application Data

(60) Provisional application No. 60/378,486, filed on May 6, 2002.

(51) Int. Cl.[7] .................. H01H 37/50; H01H 37/32
(52) U.S. Cl. .................. 337/139; 337/140; 337/141; 337/395
(58) Field of Search ................ 337/123, 139, 337/140, 141, 382, 393, 395, 397, 398; 236/59

(56) References Cited

U.S. PATENT DOCUMENTS

| | | | |
|---|---|---|---|
| 348,841 A | 9/1886 | Hainley | |
| 1,288,060 A | 12/1918 | Le Duc | |
| 1,658,669 A | 2/1928 | Cohn et al. | |
| 2,518,941 A | 8/1950 | Satchwell et al. | |
| 2,975,307 A | 3/1961 | Schroeder et al. | |
| 3,452,175 A | 6/1969 | Wilkes | |
| 3,452,309 A | 6/1969 | Wilkes | |
| 3,634,803 A | * 1/1972 | Willson et al. | ............ 337/123 |
| 3,641,296 A | 2/1972 | Schwarz | |
| 3,725,835 A | 4/1973 | Hopkins et al. | |

(Continued)

FOREIGN PATENT DOCUMENTS

| | | | |
|---|---|---|---|
| DE | 4209815 A1 | 9/1993 | |
| DE | 19509177 A1 | 9/1996 | |
| EP | 0147491 A1 | 7/1985 | |
| FR | 77 09117 | 10/1978 | |
| FR | 2730766 | 8/1996 | |
| GB | 2068545 A | * 8/1981 | ........... G01K/11/00 |
| GB | 2093589 A | 9/1982 | |
| GB | 2334046 A | 8/1999 | |
| JP | 07 274561 A | 10/1995 | |
| KR | 9605617 B1 | 4/1996 | |
| KR | 9607599 B1 | 6/1996 | |
| WO | WO 98/08355 | 2/1998 | |
| WO | WO 01/12985 A1 | 2/2001 | |

OTHER PUBLICATIONS

Aircraft Maneuverability, http://www.cs.ualberta.ca/~database/MEMS/sma_mems/flap.html, last modified Aug. 17, 2001, printed Apr. 17, 2003, pp. 1–2.

Bokaie, Latch–Release Pin Puller with Shape–Memory Alloy Actuator, Lewis Research Center, http://www.nasatech.com/Briefs/Feb98/LEW16511.html, printed Apr. 17, 2003.

(Continued)

*Primary Examiner*—Anatoly Vortman

(57) ABSTRACT

A mechanical release mechanism is provided. The mechanical release mechanism includes two structural members in slideable relation one to another. A latch holds one structural member in a latched position relative to the other structural member. A shape memory alloy member disposed within one of the structural members is used to move the latch holding the other structural member thereby allowing relative motion between the structural members.

21 Claims, 4 Drawing Sheets

U.S. PATENT DOCUMENTS

| | | | |
|---|---|---|---|
| 3,748,197 A * | 7/1973 | Willson et al. ............ | 148/563 |
| 3,797,450 A | 3/1974 | Frisbee | |
| 3,940,935 A | 3/1976 | Richardson et al. | |
| 3,946,699 A | 3/1976 | Mirshak | |
| 4,027,953 A | 6/1977 | Jacob | |
| 4,150,544 A | 4/1979 | Pachter | |
| 4,319,659 A | 3/1982 | Heckelman | |
| 4,427,216 A | 1/1984 | Kato et al. | |
| 4,559,512 A | 12/1985 | Yaeger et al. | |
| 4,579,006 A | 4/1986 | Hosoda et al. | |
| 4,586,335 A | 5/1986 | Hosoda et al. | |
| 4,626,085 A | 12/1986 | Suzuki | |
| 4,742,680 A | 5/1988 | Mecca | |
| 4,751,821 A | 6/1988 | Birchard | |
| 4,806,815 A | 2/1989 | Honma | |
| 4,811,564 A | 3/1989 | Palmer | |
| 4,829,767 A | 5/1989 | Mecca | |
| 4,841,730 A | 6/1989 | McDonald | |
| 4,884,557 A | 12/1989 | Takehana et al. | |
| 4,887,430 A * | 12/1989 | Kroll et al. ............... | 60/527 |
| 4,932,210 A | 6/1990 | Julien et al. | |
| 4,977,886 A | 12/1990 | Takehana et al. | |
| 5,014,520 A | 5/1991 | Orner et al. | |
| 5,092,781 A | 3/1992 | Casciotti et al. | |
| 5,127,228 A | 7/1992 | Swenson | |
| 5,129,753 A | 7/1992 | Wesley et al. | |
| 5,165,897 A | 11/1992 | Johnson | |
| 5,166,832 A | 11/1992 | Zychowicz | |
| 5,172,551 A | 12/1992 | Nakajima et al. | |
| 5,235,225 A | 8/1993 | Colgate et al. | |
| 5,312,152 A | 5/1994 | Woebkenberg, Jr. et al. | |
| 5,329,873 A | 7/1994 | Tiballi | |
| 5,344,506 A | 9/1994 | DeAngelis | |
| 5,499,702 A | 3/1996 | Wang | |
| 5,556,370 A | 9/1996 | Maynard | |
| 5,563,466 A | 10/1996 | Rennex et al. | |
| 5,578,053 A * | 11/1996 | Yoon ....................... | 606/185 |
| 5,618,066 A * | 4/1997 | Fu-Hsiang ................ | 292/62 |
| 5,624,012 A | 4/1997 | Wang | |
| 5,629,662 A * | 5/1997 | Floyd et al. .............. | 337/36 |
| 5,685,148 A | 11/1997 | Robert | |
| 5,694,663 A | 12/1997 | Tserng | |
| 5,713,870 A * | 2/1998 | Yoon ....................... | 604/174 |
| 5,747,993 A | 5/1998 | Jacobsen et al. | |
| 5,763,979 A | 6/1998 | Mukherjee et al. | |
| 5,770,913 A | 6/1998 | Mizzi | |
| 5,771,742 A | 6/1998 | Bokaie et al. | |
| 5,779,386 A | 7/1998 | Eichhorn | |
| 5,829,253 A | 11/1998 | Long et al. | |
| 5,865,418 A * | 2/1999 | Nakayama et al. ........ | 251/11 |
| 5,901,554 A | 5/1999 | Greschik | |
| 5,917,260 A | 6/1999 | Garcia et al. | |
| 5,990,777 A * | 11/1999 | Whiteman, Jr. ........... | 337/140 |
| 6,008,992 A | 12/1999 | Kawakami | |
| 6,019,113 A | 2/2000 | Allston et al. | |
| 6,069,420 A | 5/2000 | Mizzi et al. | |
| 6,073,469 A * | 6/2000 | Julien ...................... | 70/38 A |
| 6,126,115 A | 10/2000 | Carrier et al. | |
| 6,133,816 A * | 10/2000 | Barnes et al. ............. | 337/123 |
| 6,164,784 A | 12/2000 | Butera et al. | |
| 6,218,762 B1 | 4/2001 | Hill et al. | |
| 6,255,934 B1 * | 7/2001 | Gadini et al. ............. | 337/393 |
| 6,326,707 B1 | 12/2001 | Gummin et al. | |
| 6,327,855 B1 | 12/2001 | Hill et al. | |
| 6,333,583 B1 | 12/2001 | Mahadevan et al. | |
| 6,364,496 B1 | 4/2002 | Boddy et al. | |
| 6,371,030 B1 * | 4/2002 | Gilman et al. ............ | 102/529 |
| 6,374,608 B1 | 4/2002 | Corris et al. | |
| 6,404,098 B1 | 6/2002 | Kayama et al. | |
| 6,434,333 B2 | 8/2002 | Tanaka et al. | |
| 6,450,064 B1 | 9/2002 | Christiansen et al. | |
| 6,508,437 B1 | 1/2003 | Davis | |
| 6,527,310 B1 | 3/2003 | Bellamy | |
| 6,574,958 B1 | 6/2003 | MacGregor | |

OTHER PUBLICATIONS

Bone Plates, http://www.cs.ualberta.ca/~database/MEMS/sma_mems/bone.html, last modified Aug. 17, 2001, printed Apr. 17, 2003, pp. 1–2.

Glossary: Pseudo–elasticity (or super–elasticity), http://www.cs.ualberta.ca/~database/MEMS/sma_mems/glossary.cgi, last modified Aug. 17, 2001, printed Aug. 17, 2003, pp. 1–2.

Glossary: Shape Memory Effect, http://www.cs.ualberta.ca/~database/MEMS/sma_mems/glossary.cgi, last modified Aug. 17, 2001, printed Apr. 17, 2003, pp. 1–2.

Grant et al., "Variable Structure Control of Shape Memory Alloy Actuators," *IEEE Control Systems* 17(3):80–88, 1997.

Hashimoto et al., "Application of Shape Memory Alloy to Robotic Actuators," *J. Robotic Systems* 2(1):3–25, 1985.

Hirose et al., "A new design of servo–actuators based on the shape memory effect," *Theory and Practice of Robots and Manipulators*, 339–349, 1984.

Hodgson et al., Shape Memory Alloys, http://www.sma-inc.com/SMAPaper.html, 1999, printed Apr. 17, 2003, pp 1–12.

Ikuta et al., "Mathematical model and experimental verification . . . ," *IEEE Robotics and Automation* 4:103–108, 1991.

Ikuta et al., "Shape Memory Alloy Servo Actuator System with Electric Resistance Feedback and Application for Active Endoscope," *Proc. IEEE Int. Conf. on Robotics and Information* 427–430, 1988.

Ikuta, "Micro/Miniature Shape Memory Alloy Actuator," *IEEE Robotics and Automation* 3:2156–2161, 1990.

Kuribayashi, "A New Actuator of a Joint Mechanism Using TiNi Alloy Wire," *Int. J. Robotics* 4(4):47–58, 1986.

Mills JW, "Lukasiewicz' Insect: The Role of Continuous–Valued Logic in a Mobile Robot's Sensors, Control, and Locomotion," in *Siquito: Advanced Experiments with a Simple and Inexpensive Robot* Chapter 12 , pp. 197–211, IEEE Computer Society Press, Los Alamitos, CA USA ISBN 0–8186–7408–3, 1993.

Otsuka et al., "Shape Memory Materials," pp. 36–48, Cambridge University Press, Cambridge, England, 1998, ISBN 0–521–4448TX.

Rediniotis et al., Development of a Shape–Memory–Alloy Actuated Biomimetic Hydrofoil, Journal fo Intelligent Material Systems and Structures, 13:35–49, 2002.

Robotic Muscles, http://www.cs.ualberta.ca/database~database/MEMS/sma_mems/muscle.html, last modified Aug. 17, 2001, printed Apr. 17, 2003, pp. 1–2.

Shape Memory Alloys, http://www.cs.ualberta.ca/~database/MEMS/sma_mems/sma.html, last modified Aug. 17, 2001, printed Apr. 17, 2003, pp. 1–4.

Smith et al., Development of Shape Memory Alloy (SMA) Actuated Mechanisms for Spacecraft Release Applications, SSC99–XI–7, 13th AIAA/USU Conference on Small Satellites.

Technical Characteristics of FLEXINOL™ Actuator Wires, Dynalloy, Inc., printed on Feb. 26, 2001.

WPI Database XP002202662, "Shape memory metal actuator control device—has minimum and maximum detector to monitor state of actuator based on its minimum and maximum allowable impedance," Oct. 20, 1995.

* cited by examiner

REUSABLE SHAPE MEMORY ALLOY ACTIVATED LATCH

CROSS REFERENCE TO RELATED APPLICATION

This application claims benefit under 35 U.S.C. 119 (e) U.S. Provisional Application Ser. No. 60/378,486 entitled "Mechanical Reset Actuator (NanoLatch)" filed May 6, 2002, which is incorporated herein by reference in its entirety.

FIELD OF THE INVENTION

The present invention relates to a latch and more particularly to a latch that may be repeatably activated through the use of shape memory alloy members.

BACKGROUND OF THE INVENTION

The thermoelastic properties of shape memory alloys (SMA) have been known since the 1930s. Experimental use of SMA continued for decades. Commercially viable uses for SMAs remained elusive until the 1990s. Today, SMAs are finding unique applications in a variety of industries from the automobile industry to the medical industry.

A need exists for compact, inexpensive linear SMA actuators. Applications for such actuators can be found in everything from CD eject mechanisms to projectile launchers on children's toys. However, existing linear actuators typically employ a purely mechanical release. Existing mechanical release mechanisms may contain numerous mechanical linkages and levers. Additionally, existing SMA linear actuators require additional electronics and complexity in order to couple the typically electronic "release" signal to the purely mechanical release mechanism in the actuator.

In view of the foregoing, what is needed is an improved linear SMA actuator release mechanism to overcome the shortcomings of existing mechanical release mechanisms.

SUMMARY OF THE INVENTION

A mechanical release mechanism that repeatably provides SMA based latch actuation is described. The mechanical release mechanism includes a first structural member moveable between a latched position and an unlatched position, a bias member coupled to the first structural member, and a second structural member. The SMA actuated latch is integrated with the second structural member. The latch has a bias position above the surface of the second structural member. In the bias position, the latch is positioned to oppose the force generated by the bias member when the first structural member is in the latched position. Additionally, an SMA member is mounted within the second structural member and is coupled to the latch. When activated, the SMA member produces a linear activation force that moves the latch towards the surface of the second structural member to produce relative movement between the first structural member and second structural member.

DETAILED DESCRIPTION OF THE PREFERRED EMBODIMENTS

Figure 1:
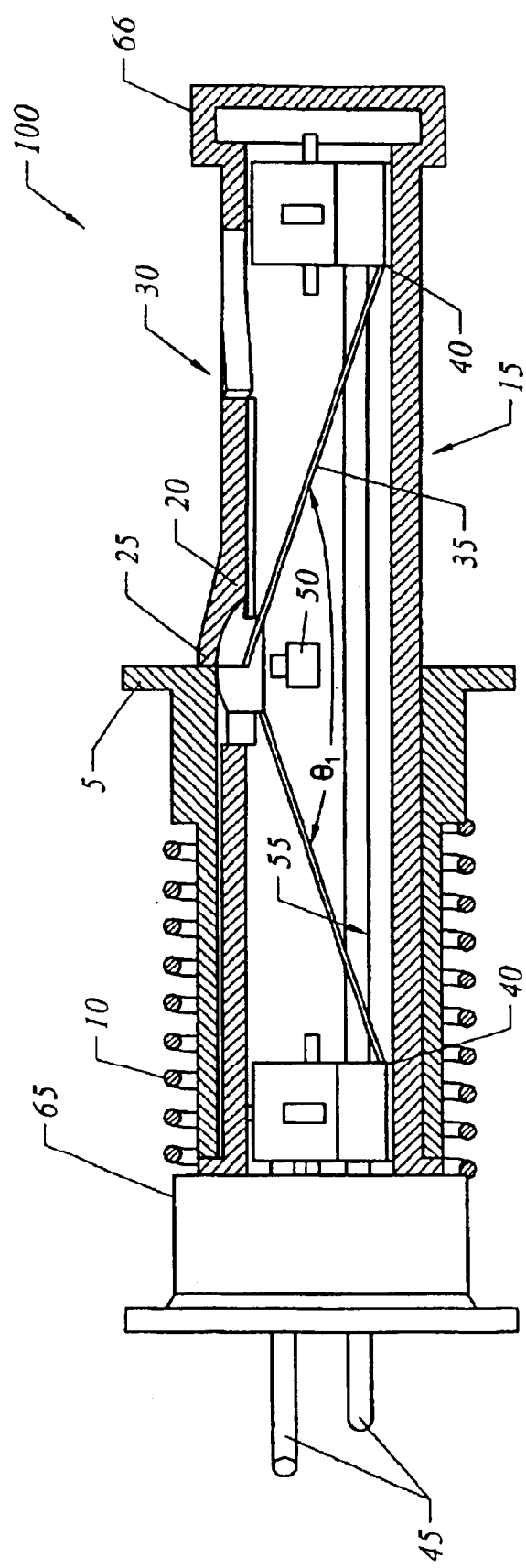
FIG. 1 is a cross-sectional view of a first exemplary embodiment of an SMA actuator of the invention in the latched position.
Figure 2:
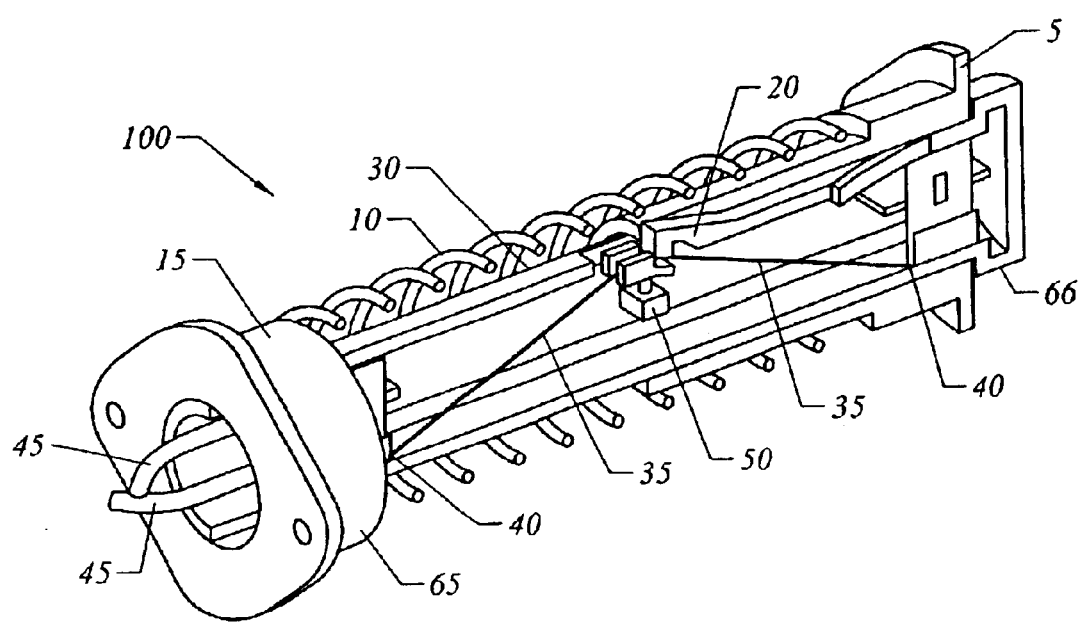
FIG. 2 is a perspective cross-sectional view of the first exemplary embodiment of a SMA actuator of the invention in an unlatched position.

A first exemplary embodiment of an SMA activated linear actuator 100 is shown in FIGS. 1 and 2 and includes a first structural member 5, a second structural member 15, an SMA member 35 and a latch 20. The first structural member 5 is moveable between a latched position (FIG. 1) and an unlatched position (FIG. 2) along the longitudinal axis of the second structural member 15. A latch 20 is integrated with the second structural member 15. The latch 20 has a bias position 25 above the second structural element top surface 30. The latch 20 is positioned and sized to oppose the force generated by the bias member 10. In one preferred embodiment, the latch 20 is a separate element that is suitably joined onto the outer surface of the second structural member 15. In another preferred embodiment, the latch 20 is integrally formed into the sidewall of the second structural element 15.

In the latched position, a bias member 10 is held between the first structural member 5 and a first fixed mechanical obstruction, such as raised shoulder 65. The bias member 10 is positioned and sized to provide sufficient force upon release by latch 20 to move the first structural member 5 to the unlatched position in addition to any payload or objects (not shown) that may be coupled to first structural element 5. The payload or objects coupled to the first structural element 5 and the forces needed to move them will vary by particular application.

As illustrated in FIG. 1, an SMA member 35 is disposed within the second structural member 15. The shape memory alloy member 35 is attached to second structural member interior wall 55 at connection points 40. The shape memory alloy member 35 is also attached to latch 20. An energy source (not shown) provides electric current to power leads 45. Power leads 45 are electrically connected to shape memory alloy member 35 by suitable means, such as for example, soldering or crimping. Electric current is provided to the shape memory alloy member 35 via power leads 45 sufficient to cause the austenite thermoelastic transformation of the shape memory alloy element 35. As a result, shape memory alloy element 35 contracts. Since the shape memory alloy member 35 is fixedly attached to the second structural member interior wall 55 at connection points 40, the contraction force generated by the phase transformation of shape memory alloy member is concentrated on latch 20. The shape, type and size of the shape memory alloy member 35 is selected to apply sufficient opposing force to latch 20 to overcome the tendency of latch 20 to remain in the bias position 25. In addition, the shape memory alloy member 35 also provides sufficient force to the latch 20 to overcome the friction contact between the latch 20 and the first structural member 5 urged in to contact with latch 20 by the bias member 10. In addition to other design factors considered, an SMA member 35 of the invention will reliably and repeatably apply a release force to latch 20 sufficient to cause the latch 20 to move from the bias position 25 towards the second structural member top surface 30.

When the thermoelastic contraction force of shape memory alloy member 35 exceeds the forces acting on latch 20, latch 20 temporarily deflects out of the bias position and contact with first structural member 5. Once latch 20 has been temporarily deflected out of contact with first structural member 5, relative movement between the first structural member 5 and the second structural member 15 occurs. In the current embodiment illustrated in FIG. 2, the relative movement is the first structural member 5 moving in a direction generally parallel to the longitudinal axis of the second structural member 15. The above described movement will now be used to define two planes of motion useful to a complete understanding of the present invention. The latch plane of motion is a plane that is substantially normal to the deflection motion of the latch 20. In FIG. 1, the latch plane exists in an orientation that is parallel to and includes the longitudinal axis of the second structural member 15. Alternatively, the latch plane could be thought of as a horizontal plane beneath the latch 20 that contains both SMA attachment points 40. The release plane of motion refers to a plane oriented parallel to the motion of the first member 5 as it moves from a latched to an unlatched position. In FIG. 1, the release plane of motion is parallel to the longitudinal axes of the first and second structural members 5, 15. Thus, in the embodiment of FIG. 1, the latch plane of motion and the release plane of motion are parallel.

As illustrated in FIG. 2, when the force stored in bias member 10 is released, the first structural member 5 moves to an unlatched position. Movement of the first structural member 5 is confined by a second fixed mechanical obstruction 66 on the second structural member 15. In the embodiment illustrated in FIG. 2, the second fixed mechanical obstruction 66 may be a shoulder or boss on the second structural member 15 positioned such that the range of motion of the first structural member 5 is defined by the distance from the latched position against the latch 20 and the unlatched position against the shoulder on boss 66.

Range of motion of the first structural member 5 also determines the size of bias element 10. Consider an embodiment where the bias element 10 is a spring. Now, consider a specific spring 10 having an extended length of 30 mm and a compressed length of 10 mm. This spring would have an advantageous use range from about 10 mm to 20 mm. A use range selected that is less than the extended spring length ensures that the spring still imparts force to the first structural member 5 even at the end of the range of motion of the first structural member 5. In other alternative embodiment of the present invention, the bias element 10 is a spring having an extended length that is about 33% longer than the range of motion of the first structural member 5. In another alternative embodiment, the bias element 10 is a spring having an extended length that is more than about 50% longer than the range of motion of the first structural member 5. In yet another alternative embodiment, the bias element 10 is a spring having an extended length that is more than twice the range of motion of the first structural member 5.

Once the first structural member 5 is in the unlatched position, an external force is used to return the first structural member 5 to the latched position. When the first structural member 5 is returned to the latched position, the latch 20 will return to the bias position 25 above the second structural element top surface 30. The movement of the latch 20 also returns the SMA member 35 into an extended configuration. When in the extended configuration, the SMA actuator is ready to be activated again and deflect the latch 20 out of the bias position. Extended SMA configurations are illustrated in FIGS. 1, 3, 4, and 5.

Figure 3:
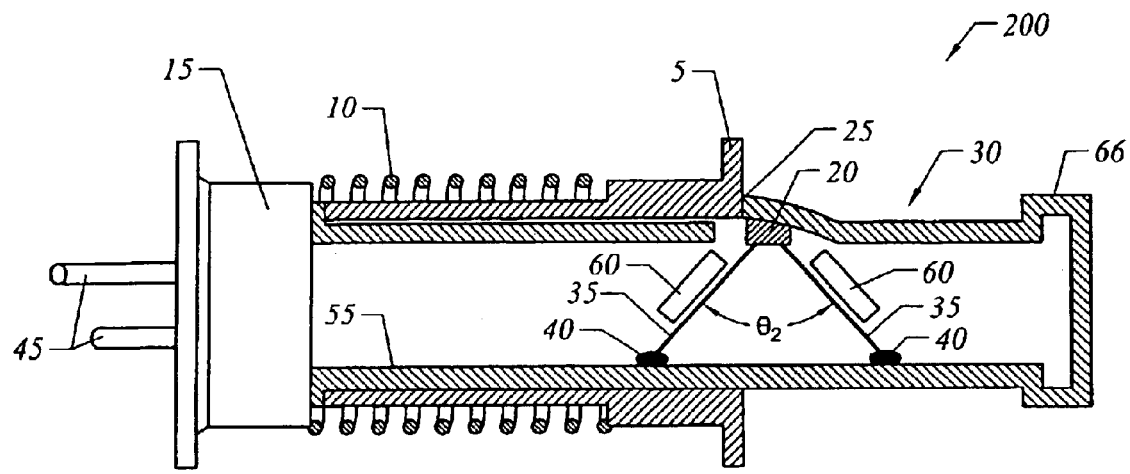
FIG. 3 is a cross-sectional view of a second exemplary embodiment of a shape memory alloy actuator of the invention in a latched position.

Another advantage of the invention may be appreciated through reference to FIGS. 1 and 3. The SMA member 35 is attached to an interior wall 55 at attachment points 40 and to the latch 20. An included angle is defined between the connection points 40 and the latch 20. An included angle $\theta 1$ is illustrated in FIG. 1 and an included angle $\theta 2$ is illustrated in FIG. 3. Included angle variation may be used to advantage with SMA member 35 to provide a wide range of forces and/or deflection of the latch 20. Briefly, variation in the included angle alters the vector force generated by the SMA wires 35 as applied to the latch 20. In the case of larger included angles, the horizontal vectors are larger, tend to dominate the vector addition and produce greater stroke (i.e., deflection of the latch 20). Because the resulting vertical vectors are smaller a smaller force is applied to the latch 20. On the other hand, smaller included angles tend to have smaller horizontal vector components. This results in smaller stroke or deflection of the latch 20. However, since the vertical vector components are large and dominate the vector addition, a higher force is applied to the latch 20.

In the embodiment of FIG. 1, the included angle $\theta 1$, is greater than 90°. This embodiment takes advantage of the fact that most shape memory alloy materials may deflect about 3% of their length repeatably without damage. As such, since the included angle $\theta 1$ is selected so that a longer shape memory alloy member 35 is used, a greater stroke or deflection results at the latch 20. Embodiments of the present invention incorporating this design feature may be used advantageously in applications where a large deflection of the latch 20 is desired. One disadvantage of this high stroke embodiment illustrated in FIG. 1 is that since the latch 20 moves out of the bias position 25 in a direction generally perpendicular to the second structural member 15, not all of the force generated by the shape memory alloy member 35 is directed to moving the latch 20 (i.e., as above, for a given SMA wire length, a small vertical vector component results in a low force). In another embodiment, the included angle $\theta 1$ is about 125°.

An alternative included angle configuration is illustrated in FIG. 3. The included angle $\theta 2$ is also defined by the shape memory alloy member 35 path between the connection points 40 and the latch 20. Included angle $\theta 2$ is less than included angle $\theta 1$. The use of a smaller included angle $\theta 2$ results in the shape memory alloy member 35 being more closely aligned to oppose the bias force of latch 20 (i.e., a larger vertical vector force component is generated/applied to the latch 20). In an embodiment where the included angle $\theta 2$ is nearly zero, the shape memory alloy member 35 is positioned to directly or nearly directly oppose the bias force of the latch 20. In this manner, embodiments of the present invention incorporating this design feature take advantage of the fact that shape memory alloy materials deflect in a useable range along their longitudinal axis. As the included angle $\theta 2$ decreases, the longitudinal axis of the shape memory alloy member 35 moves towards a position more directly in opposition to the latch 20. In one embodiment, the included angle $\theta 2$ is about 45° or less. In another embodiment, the included angle $\theta 2$ is about 25° or less.

Thus far, the embodiments of the inventive mechanical release mechanism described above generally involve a concentric arrangement between the first structural member and the second structural member (FIGS. 1, 2, 3, 4). In other words, the latch plane of motion and the release plane of motion are parallel and in the same plane. The above embodiments illustrate a coaxial arrangement of the first structural member 5 and the second structural member 15. It is to be appreciated that embodiments of the present invention may be advantageously utilized in other configurations of the first structural member 5 and the second structural member 15, such as where the first structural member 5 moves at an angle relative to the longitudinal axis of the second structural member 15.

Figure 5:
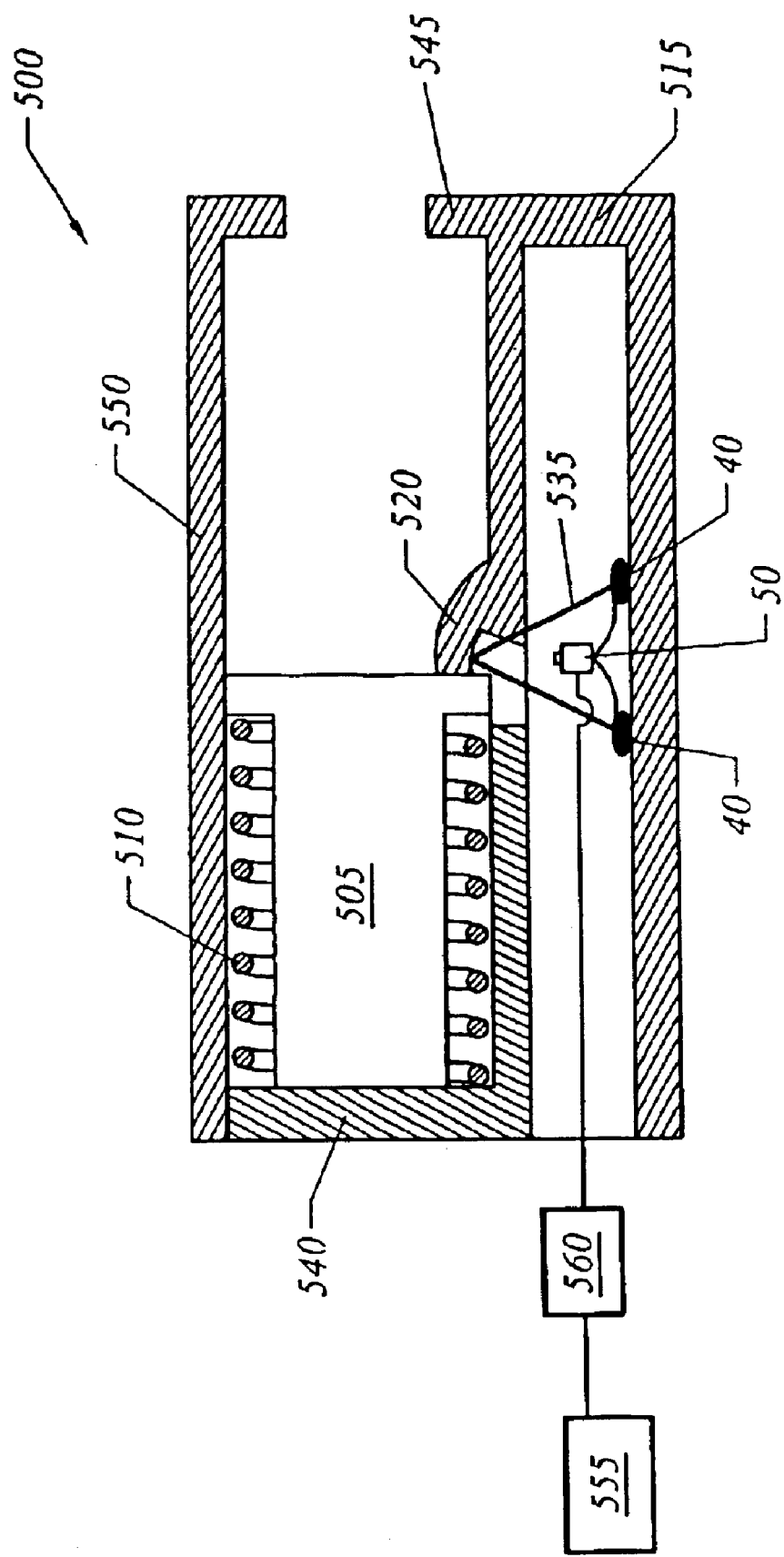
FIG. 5 is a cross-sectional view of another exemplary embodiment of the present invention.

Another alternative embodiment of the present invention will now be described with regard to FIG. 5. FIG. 5 illustrates a cross section view of an exemplary embodiment of an SMA actuator 500 whereby the structural members are not coaxial, and the latch plane of motion and the release plane of motion are still parallel but the planes are vertically displaced relative to one another. The SMA actuator 500 includes a first structural member 505 in slideable relation to a second structural member 515. Bias member 510 provides a source of stored energy for relative movement of the first structural member 505 relative to the second structural member 515. In the latched position shown in FIG. 5, bias member 510 is compressed between a first fixed mechanical obstruction 540 on the first structural member 515 and the latch 520. Latch 520 is similar to latch 20 in that it is maintained in a bias position above the surface of the second structural member and that the latch 520 is moved from the bias position by thermoelastic contraction forces generated by the shape memory alloy member 535. The shape memory alloy member 535 is shaped, sized and disposed internal to the second structural member 515 to overcome the bias position force inherent in the latch 520 as well as the friction force that exists between the latch 520 and the first structural member 505 as a result of bias member 510 urging the first structural member 505 into pressing contact with the latch 520 while in the latched position (FIG. 5).

FIG. 5 also illustrates the power and latch control circuitry that may be used to advantageously operate embodiments of the invention and more easily incorporate embodiments of the present invention into a wide variety of applications. A few of those applications are described below. Also illustrated in FIG. 5 is a power source 555 that is connected to a release signal switch 560, which is in turn connected to a protective switch 50 and thence to the SMA member 535. Power source 555 is sized and selected to provide sufficient current to resistively heat the SMA member 535 above its austenite transition temperature and produce the desired contraction of the SMA member 535.

Release signal switch 560 could be any of a wide variety of electrical, mechanical or electromechanical indicators useful in generating the signal for the shape memory alloy actuator of the invention to unlatch or release. The release signal switch 560 could have an electronically open circuit that closes when the "release" signal is received. Alternative embodiments of the release signal switch 560 are numerous and depend upon application. For example, a projectile (not shown) may be placed into contact with the first structural member 505. Where the shape memory alloy actuator 500 has been integrated into, for example, a toy tank such that when the first structural member 505 is released by latch 520, the force stored in bias member 510 results in the forceable ejection of the projectile (not shown). In one embodiment, the release signal switch 560 receives an electronic signal generated by a remote or radio control device used to control the toy tank. The release signal switch 560 may be directly wired, in the case of a remote control, to a "FIRE" button built on the remote control. Alternatively, the release signal switch 560 may include a receiver adapted to receive an electronically transmitted "FIRE" signal from a transmitter on a radio control device. In either the remote control or radio control embodiments, when the "FIRE" signal is received, the release signal switch 560 closes thereby allowing electrical current from power source 555 to pass via protective switch 50, to the SMA member 535. Sufficient electrical power is provided to the shape memory alloy member 535 to result in deflection of latch 520 out of the bias position to allow relative movement between the first structural member 505 and the second structural member 515. With the first structural member 505 moving with a force generated by bias member 510.

In another alternative embodiment, the release signal switch 560 may include a receiver adapted to receive an electronic signal from an external source, such as, for example a gun that generates an infrared beam. In this embodiment, the shape memory alloy actuator of the invention may be incorporated into the design of, for example, a toy monster such that when the release signal is received a part of the monster's body will be removed by the force of the first structural member. Consider, for example, where the release signal switch 560 includes an infrared receiver integrated into the exterior of the monster near the connection point of the monster head to the monster body. The monster head is mechanically coupled to the first structural member 505. In operation, when an infrared beam generated, for example by a toy gun, makes contact with the receiver integrated into release signal switch 560 electrical contact is made between the power source 555 and the shape memory alloy member 535. As described above, contraction of the shape memory alloy member 535 deflects the latch 520 allowing the stored energy of bias member 510 to be released resulting in relative movement between the first structural member 505 and the second structural member 515. In the case of the toy monster described above, the relative movement between the first structural member 505 and the second structural member 515 results in the monster's head being ejected from his body. As illustrated by the toy tank and monster examples above, one advantage of using the release signal switch 560 is that numerous and various release signals may be employed to initiate the shape memory alloy based release actuation of the present invention. While the above examples are from the toy industry for toy based applications, it is to be appreciated that embodiments of the SMA actuator of the invention may be applied to consumer electronics applications, industrial applications and automotive applications, for example.

FIG. 5 also illustrates an alternative arrangement of the first structural member 505 and the second structural member 515. In this illustrative embodiment, the first structural member 505 is slideably disposed relative to the second structural member 515 and moves from the latched position (FIG. 5) to an unlatched position against the second fixed mechanical obstruction 545 along the guide 550. As such, the guide 550 along with other features of the second structural member 515 confine the first structural member 505 to movement between the latched and unlatched states.

To facilitate reliable and repeatable operation of the shape memory alloy member 35, embodiments of the present invention also provide protective mechanisms intended to ensure extended lifetime, damage free operation of the SMA member 35. As described above with regard to FIG. 1, the SMA member 35 is heated above its austenite transition temperature by applying an electric current via power leads 45. Prolonged application of electric current to SMA member 35 may cause it to overheat or degrade its material properties to such a degree that it operational lifetime will be drastically limited.

Protective mechanisms in embodiments of the present invention are provided to address these concerns. One protective mechanism is limit switch 50 (FIGS. 1, 2 and 5). Limit switch 50 is disposed in the electrical circuit that powers SMA member 35. In normal position (FIG. 1) limit switch 50 is closed and power may be applied to SMA member 35. When the limit switch 50 is in the activated position (FIG. 2) the limit switch 50 is open and prevents electrical power from being provided to SMA member 35. In one illustrative embodiment, the limit switch 50 is positioned within the second structural member 15 and in proximity to the latch 20 (FIG. 1). The limit switch 50 is shaped, sized and positioned relative to the latch 20 such that when the SMA member 35 reaches the designed contraction point (i.e., when latch 20 has been deflected sufficiently out of the bias position 25 to allow relative movement between the first structural member 5 and the second structural member 15) the latch 20 activates the limit switch 50. When the limit switch is activated, power supplied to the SMA element 35 is shut off. When the latch 20 is returned to the bias position 25, the limit switch 50 returns to the normally closed position restoring the electric power supply circuit to shape memory alloy member 35.

Another SMA member protective mechanism is illustrated in FIG. 3. Heat sinks 60 may also be employed to increase the reliable operation of the SMA member 35. One aspect of reliable and repeatable operation of SMA components is the dissipation of heat generated to transform the SMA from the austenite phase to the martensite phase. Damage to the SMA component may occur if heat generated by the thermoelastic phase transformation is not effectively dissipated. In one embodiment, heat sinks 60 may be disposed adjacent to shape memory alloy member 35 to assist in heat dissipation. In an alternative embodiment, heat sinks 60 may be positioned on the opposite side of the SMA wire 35 (i.e., positioned within the included angle formed by the SMA element 35). The heat sinks 60 start with some significant clearance between themselves and the SMA, and this clearance (an air gap) insures that the heat sinks do not draw significant amounts of heat away from the SMA when it is in an extended configuration. The SMA contracts when it is heated and reaches its transformation temperature. Due to the mechanical configuration of the device, the contracting SMA moves closer to the heat sinks, reducing the clearance and air gap and thus making the heat sinks more effective at drawing heat from the SMA. The further the SMA contracts the greater this effect becomes. In an alternative embodiment, the heat sinks 60 are placed in such a way that the SMA would just establish contact with the heat sinks 60 when maximum SMA contraction occurs.

Figure 4:
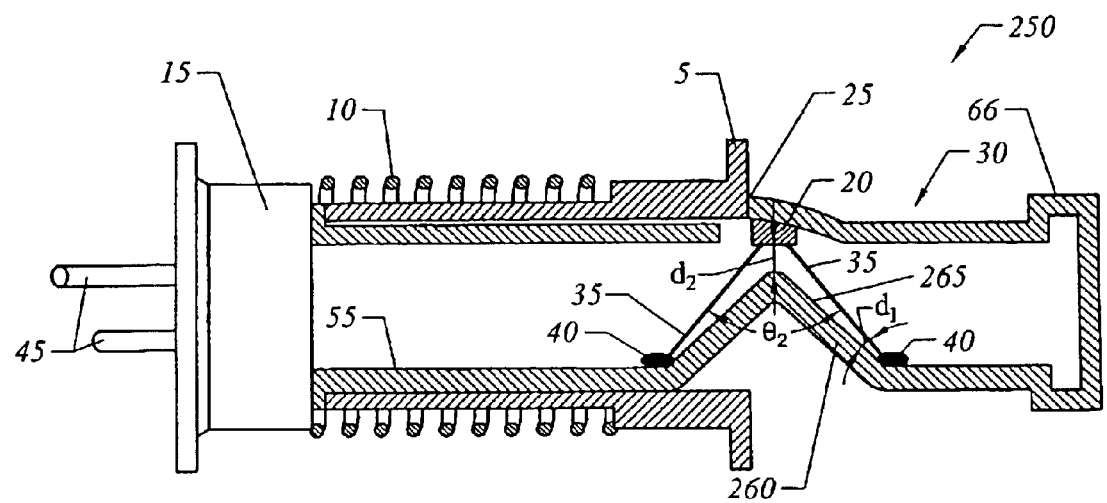
FIG. 4 is a cross-sectional view of a third exemplary embodiment of an SMA actuator of the invention in a latched position illustrating an exemplary embodiment of a heat sink of the present invention.

In yet another embodiment, the heat sink is constructed, sized and positioned relative to the SMA range of motion such that the SMA does not contract far enough to contact the heat sinks 60. Instead, the contracting SMA will reach a thermal equilibrium where the heat sinks 60 are drawing energy out of the SMA at the same rate that energy is being added to the SMA at a point just prior to full SMA contraction. As a result, the SMA wire is never overheated. The advantageous spacing of the heat sink (provided by sidewall provided heat sink 260) to the SMA element 35 is illustrated in FIG. 4. In the latched position, the heat sink to latch spacing d2 is greater than when the latch 20 is in the unlatched position. In the unlatched position, the SMA element is contracted and is closer to the top surface 265 of the heat sink structure 260. Near the SMA element connection points 40, the spacing d1 between the SMA element 35 and the heat sink structure 260 is smaller. It is to be appreciated that the SMA element 35 spacing decreases traveling from a point on the outer surface 265 adjacent the latch 20 and traveling towards the attachment point 40.

In yet another alternative embodiment, the heat sink equilibrium operation described above is used instead of the limit switch 50 to control SMA contractions. Another alternative heat exchange embodiment is illustrated in FIG. 4. The sidewall of the second structure number 15 is used here as the heat sink. Here the sidewall is deformed into the inverted V shape sidewall 260. The inverted V shape sidewall 260 is selected to complement the corresponding included angel of the SMA wire. The top surface 265 is positioned in proximity to the SMA wire 35 as discussed above with regard to heat sinks 60 above. While FIG. 4 illustrates the deflection of the sidewall of the second structural member being used as a heat sink, it is to be appreciated that the structure formed from heat absorbing material may be formed in the stage generally of inverted V shape at heat sink 260 and inserted into the release mechanism 200 of FIG. 3. In addition, any of the heat sink structures described above could be formed of a first material and then coated with a second metal having an improved heat transfer capabilities. For example, the first material could be made from plastic and the second material could be a metal coating such as, for example, aluminum, nickel, brass and the like to improve heat transfer from the SMA wire into the heat sink.

A specific embodiment of an SMA actuator will now be described through reference to FIG. 1. In this embodiment, the first structural member is shaped as a piston coaxially disposed about the second structural member that is shaped as a piston guide. The piston guide and piston may be formed from virtually any material with sufficient strength for the intended application. In this example, the piston and piston guide are formed from plastic. The latch 20 is integrally formed in the surface of the piston guide and may be shaped in the form of a finger latch protruding in a bias position above the surface of the piston guide. The bias member 10 is a spring.

In one illustrative embodiment, the first and second structural members would be molded from Acetal or a similar plastic. The SMA wire 35 would be formed of TiNi SMA material with a diameter of about 0.004", a length of about 30 mm, and an included angle of about 125 degrees. This configuration would provide for some stroke amplification in that the SMA, if it contracted only 3% of its length, contracts 0.9. mm overall. This contraction will result in a deflection of the latch of about 1 mm. The force exerted on the latch would be about 120 grams. This amount of force could allow the latch to reliably constrain and then release a spring (i.e. the bias element 10) of up to about 400 grams.

While the above embodiment have been described with regard to an SMA member 35 and 535, it is to be appreciated that embodiments of the present invention are not limited to single strand shape memory alloy wire designs. Multiple shape memory alloy wire strands may be run between connection points 40 and the latches 520 and 20. The present invention is not limited to a particular type of shape memory alloy material. While embodiments have been described with regard to shape memory alloy material containing titanium and nickel (TiNi), it is to be appreciated that other shape memory alloy materials may be used, such as for example compositions including copper, aluminum and nickel (CuAlNi) and titanium, nickel and palladium (TiNiPd) among others.

The foregoing exemplary descriptions and the illustrative preferred embodiments of the present invention have been explained in the drawings and described in detail, with varying modifications and alternative embodiments being taught. While aspects of the invention have been shown, described and illustrated, it is to be appreciated by those skilled in the art that equivalent changes in form and detail may be made therein without departing from the true spirit and scope of the invention, and that the scope of the present invention is to be limited only by the claims that follow.

We claim:

1. A mechanical release mechanism comprising:
   a first structural member moveable between a latched position and an unlatched position;
   a bias member coupled to said first structural member;
   a second structural member;
   a latch integrated with the second structural member, the latch having a bias position above the surface of said second structural member, the latch positioned to oppose the force generated by the bias member when the first structural member is in the latched position;
   a shape memory alloy member mounted within said second structural member and coupled to said latch, said shape memory alloy member producing linear activation force that moves the latch towards the surface of the second structural member to produce relative movement between the first structural member and second structural member, wherein said shape memory alloy member is connected to a first connection point within the second structural member, to the latch, and to a second connection point within the second structural member such that an included angle is formed between the first and second connection points and the latch.

2. The mechanical release mechanism of claim 1 wherein the bias member is a spring.

3. The mechanical release mechanism of claim 1 wherein said second structural member is disposed within said first structural member.

4. The mechanical release mechanism of claim 1 wherein said shape memory alloy member comprises nickel and titanium.

5. The mechanical release mechanism of claim 1 wherein said shape memory alloy member produces a linear activation force when it is heated above its austenite transition temperature by applying an electric current to the shape memory alloy member.

6. The mechanical release mechanism of claim 5 further comprising a switch disposed within the second structural member, the switch positioned such that after the latch moves towards the surface of the second structural member the switch interrupts the electric current provided to the shape memory alloy member.

7. The mechanical release mechanism of claim 1 wherein the shape memory alloy member is a wire formed from a shape memory alloy material.

8. The mechanical release mechanism of claim 1 wherein when the first structural member moves to an unlatched position, the first structural member moves in a direction generally parallel to the longitudinal axis of the second structural member.

9. A mechanical release mechanism comprising:
   a first member having a first fixed mechanical obstruction, a second fixed mechanical obstruction and a moveable mechanical obstruction disposed between the first and second fixed mechanical obstructions, the moveable mechanical obstruction movable between a cocked position and a fired position;
   a second member disposed in slideable relation to the first member and moveable between a first position when the second member is urged into contact with the moveable mechanical obstruction by a stored energy member and a second position when the second member is in contact with the second fixed mechanical obstruction; and
   a shape memory alloy wire disposed within the first member to provide a linear actuation force that selectively alters the moveable mechanical obstruction from the cocked position to the fired position, causing the stored energy member to move the second member into contact with the second fixed mechanical obstruction on the first member, wherein said shape memory alloy wire is connected to a first connection point within the first member, to the moveable mechanical obstruction, and to a second connection point within the first member such that an included angle is formed between the first and second connection points and the moveable mechanical obstruction.

10. The mechanical release mechanism of claim 9 wherein the stored energy member is a spring.

11. The mechanical release mechanism of claim 9 wherein the second member moves along the longitudinal axis of the first member.

12. The mechanical release mechanism according to claim 9 where the included angle is greater than 90°.

13. The mechanical release mechanism according to claim 9 where the included angle is less than 25°.

14. The mechanical release mechanism according to claim 9 wherein the length of shape memory alloy wire between the first connection point and the moveable mechanical obstruction is substantially equivalent to the length of shape memory alloy wire between the second connection point and the moveable mechanical obstruction.

15. The mechanical release mechanism of claim 9 wherein the moveable mechanical obstruction is integrally formed in the first member.

16. An apparatus for using a shape memory alloy to control a moveable mechanical obstruction, comprising:
   a first member, positionable between a cocked position and a fired position;
   a second member disposed in slideable relation to the first member;
   a resilient member coupled to the first member;
   a moveable mechanical obstruction integral to the second member, the moveable mechanical obstruction moveable between a cocked position and a fired position such that when the movable mechanical obstruction is in the cocked position the first member is held in the cocked position against the resilient member;
   a shaped memory alloy wire disposed within said second member and attached to the moveable mechanical obstruction such that the moveable mechanical obstruction is moved from the cocked position to the fired position by a linear actuation force generated when the shape memory alloy wire is heated above its austenite transition temperature by applying electric current to the shape memory alloy wire and that when the moveable mechanical obstruction is in the fired position the resilient member causes the first member to move relative to the second member in a direction generally parallel to the longitudinal axis of the second member.

17. The apparatus of claim 16, wherein the moveable mechanical obstruction is adapted such that it is moveable from the fired position to the cocked position for repeated use.

18. The apparatus of claim 16, further comprising a heat sink disposed within said second member.

19. The apparatus of claim 18, wherein the heat sink is positioned such that the shape memory alloy wire is moved toward the heat sink when the moveable mechanical obstruction is moved from the cocked position to the fired position, whereby the heat sink prevents the shape memory alloy wire from exceeding a determined temperature.

20. The apparatus of claim 19, wherein the heat sink is integrally formed in said second member.

21. The apparatus of claim 19, wherein the shape memory alloy wire contacts the heat sink when the moveable mechanical obstruction is moved from the cocked position to the fired position.

* * * * *

UNITED STATES PATENT AND TRADEMARK OFFICE
CERTIFICATE OF CORRECTION

PATENT NO. : 6,972,659 B2 Page 1 of 1
APPLICATION NO. : 10/431305
DATED : December 6, 2005
INVENTOR(S) : von Behrens et al.

It is certified that error appears in the above-identified patent and that said Letters Patent is hereby corrected as shown below:

Title page:
Item (73): Add the following as Assignee:

-- Alfmeier Prazision AG Baugruppen und Systemlosungen, Treuchtlingen, Germany --

Signed and Sealed this

Fourth Day of July, 2006

JON W. DUDAS
*Director of the United States Patent and Trademark Office*